Jan. 1, 1952  O. R. HAAS  2,581,017
MACHINE AND METHOD FOR FASTENING HASSOCKS
Filed Sept. 7, 1949  5 Sheets-Sheet 1

Inventor
Otto R. Haas
By his Attorney

Witness
Jas. J. Maloney

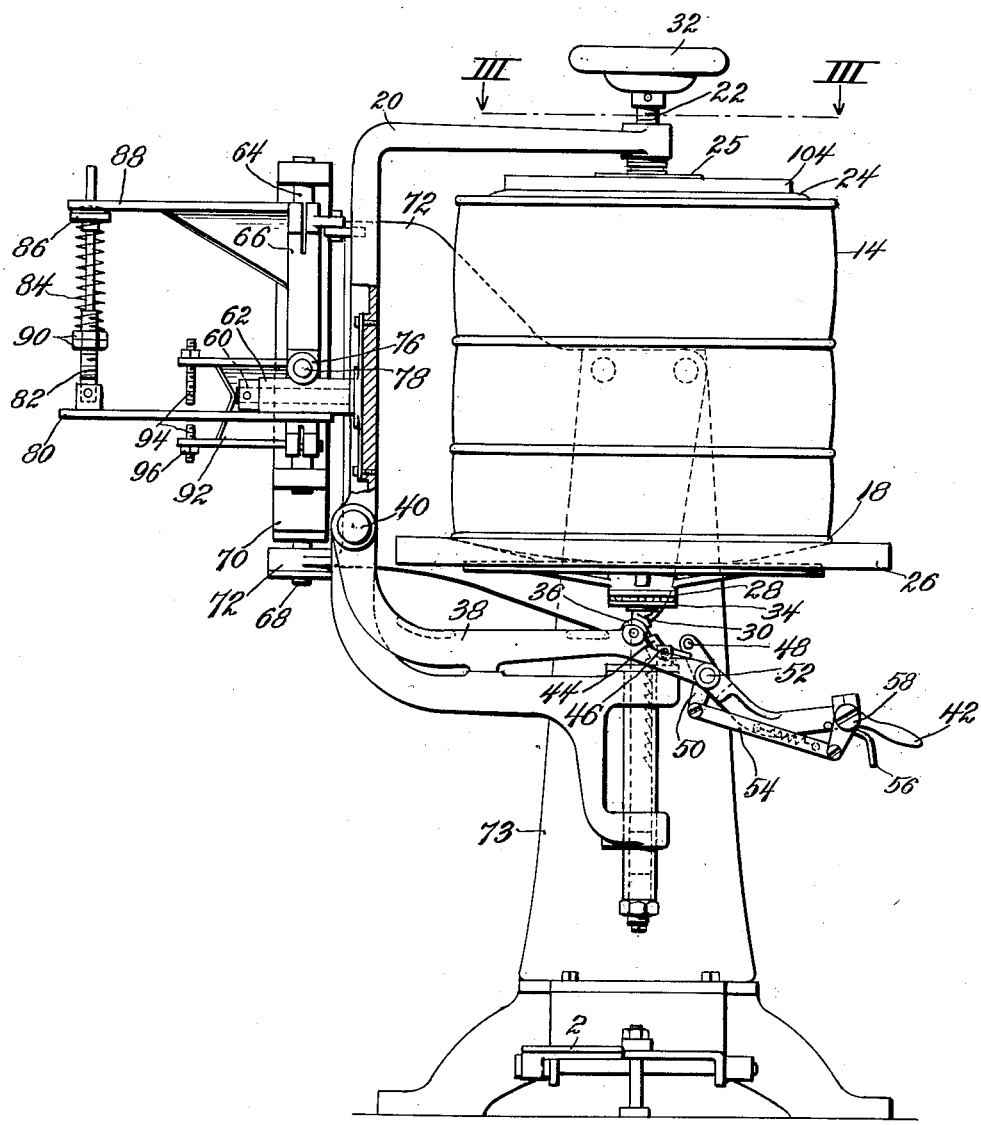

Jan. 1, 1952            O. R. HAAS            2,581,017
MACHINE AND METHOD FOR FASTENING HASSOCKS
Filed Sept. 7, 1949            5 Sheets-Sheet 3
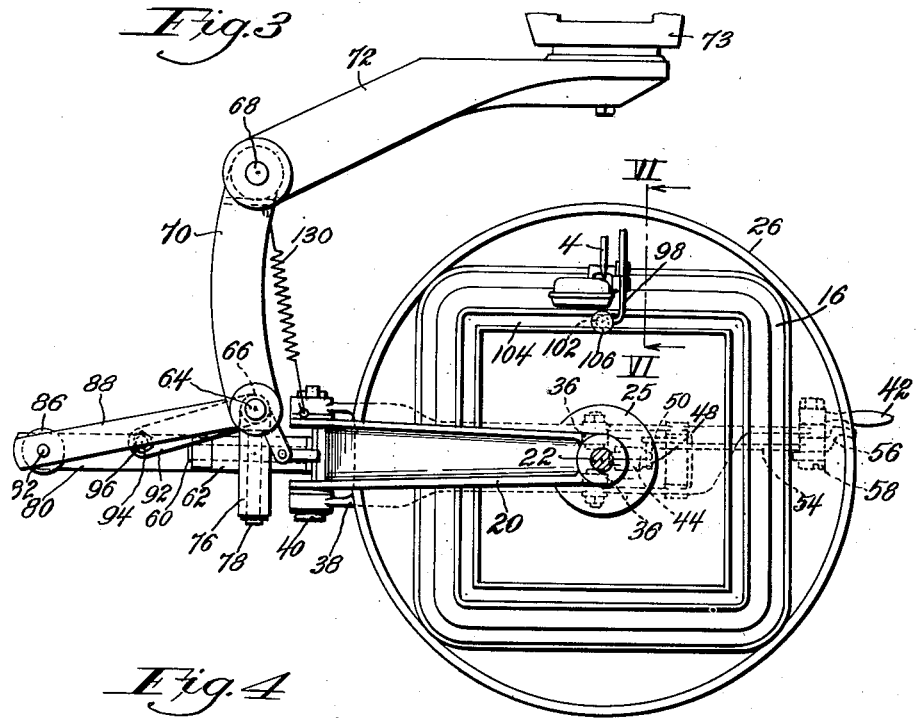
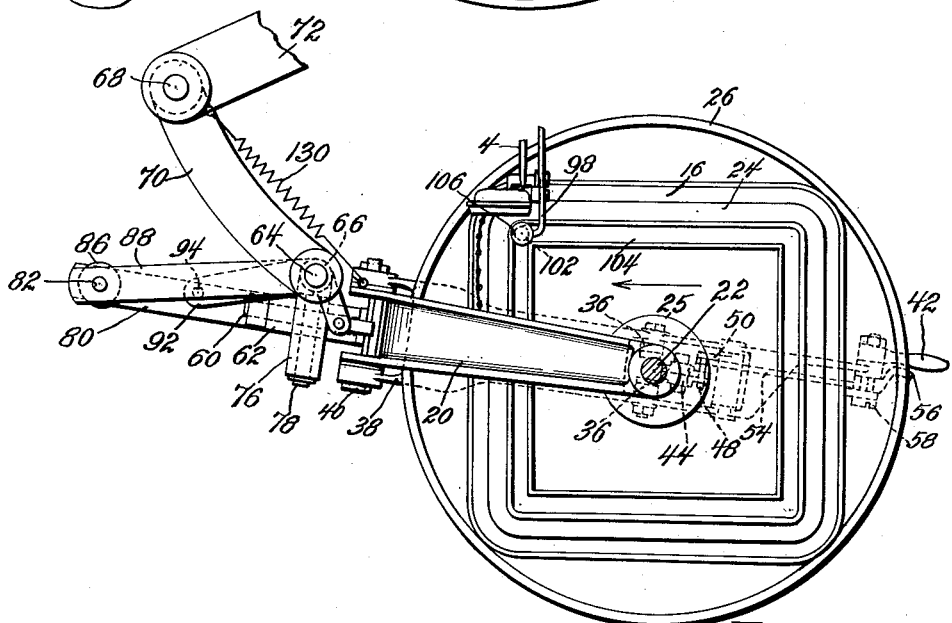
Inventor
Otto R. Haas
By his Attorney
Witness
Jas. J. Maloney Jan. 1, 1952            O. R. HAAS            2,581,017

MACHINE AND METHOD FOR FASTENING HASSOCKS

Filed Sept. 7, 1949            5 Sheets-Sheet 4

Witness
Jas. J. Maloney

Inventor
Otto R. Haas
By his Attorney

Jan. 1, 1952                 O. R. HAAS                2,581,017
MACHINE AND METHOD FOR FASTENING HASSOCKS
Filed Sept. 7, 1949                               5 Sheets-Sheet 5
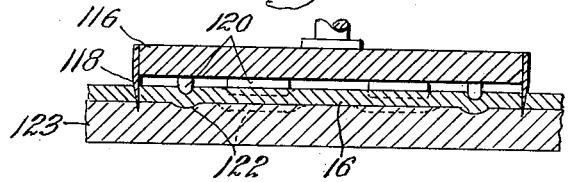
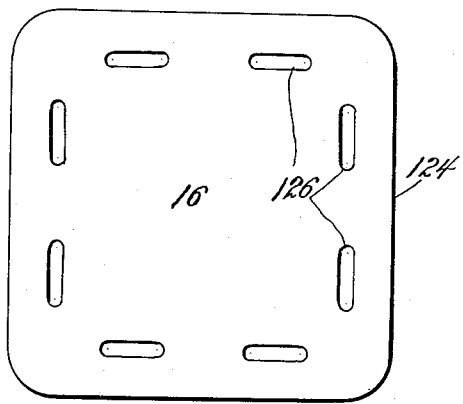
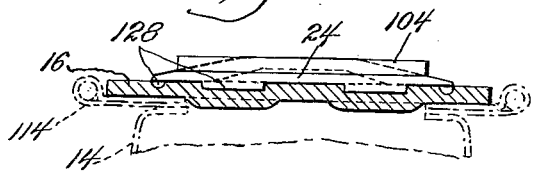
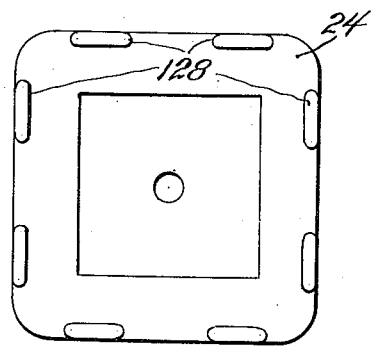
Inventor
Otto R. Haas
By his Attorney
Witness
Jas. J. Maloney.

Patented Jan. 1, 1952

2,581,017

UNITED STATES PATENT OFFICE 2,581,017

MACHINE AND METHOD FOR FASTENING HASSOCKS

Otto R. Haas, Wenham, Mass., assignor to United Shoe Machinery Corporation, Flemington, N. J., a corporation of New Jersey Application September 7, 1949, Serial No. 114,349

7 Claims. (Cl. 112—2)

The present invention relates to machines for fastening the marginal edges of a tubular casing for a hassock or similar cushion after being filled with stuffing material and to methods of manufacturing hassocks employing such machines. More particularly the invention has in view improvements in hassock fastening machines of the type disclosed in an application for United States Letters Patent, Ser. No. 774,943, filed September 19, 1947, in the name of the present inventor.

A most troublesome difficulty encountered in the manufacture of hassocks and household cushions is in supporting them and in presenting them properly to the operating devices of a fastening machine while applying the final end closure completing the hassock. The bulk and weight of such cushions necessitates the use of special supporting apparatus and, as in the machine of the prior application, this apparatus comprises clamping means for holding the stuffing of the hassock from expansion. The clamping means is supported on a pair of hinge mountings and connecting arms, the axis of the hinge mountings being vertically disposed to enable free swinging movement of the clamping means and hassock toward and from and along the fastening devices. Movement of the clamping means and the hassock in this way necessitates bodily transfer of the clamping means and hassock which, taken together, result in a mass not easily shifted through the small movements required in properly presenting the hassock to the machine.

Objects of the present invention are to improve the manufacture of hassocks, to simplify the presentation of a hassock to a fastening machine and to assist the operator of the machine in inserting a line of fastenings connecting the parts of a hassock casing being operated upon with great uniformity and accuracy, while at the same time reducing the amount of physical force and skill required. Another object is to avoid the necessity of close attention by an operator in performing a hassock casing fastening operation and to provide a machine for fastening hassock casings, which when once set in operation upon a hassock may complete the operation more or less automatically thereafter. A still further object is to avoid the need of imparting to a hassock as much bodily movement during its presentation to a fastening machine as in the use of the machine disclosed in the prior application, while at the same time obtaining equivalent or better results.

In the embodiment of the present invention a hassock support including clamping means for holding the edges of the end and side walls of a stuffed hassock casing are provided to assist in presenting the hassock to a sewing fastening machine, in which track and guide members are mounted respectively on the frame of the machine and on the hassock clamping means to direct the movements of the end and side wall edges along the point of fastening operations. Preferably, the fastening operations comprise the insertion of a thread seam, as in the machine of the prior application.

The features of the invention relating to the manufacture of hassocks comprise the use of a stuffed side wall casing and a connected end closure, together with a separate second end closure formed with permanent self-sustaining indentations thereon and applied to complete the hassock, the second end closure being clamped to the stuffed side wall and first mentioned end closure and a fastening operation being performed between the side wall edges and the second end closure, guided by the indentations on the second end closure.

These and other features of the invention as hereinafter described and claimed will appear from a consideration of the following detailed specification taken in connection with the accompanying drawings, in which:

Fig. 2 is a view in front elevation, partly in section, of the hassock supporting clamp of the machine shown in Fig. 1, with a hassock in place thereon;

Fig. 3 is a detailed sectional plan view taken along the line III—III of Fig. 2 of the hassock supporting plate and its mounting on the machine showing the relation of the parts while a side edge on a square hassock is being fastened;

Fig. 4 is a similar view of the same parts shown while sewing about the corner portion of a square hassock;

Fig. 7 is a sectional view of a combined cutting and marking die, showing its operation on a strip of material from which a hassock end closure is cut;

Fig. 8 is a plan view of a hassock end closure cut and marked with indentations by the die of Fig. 7;

Fig. 9 is a sectional view of the indented hassock end closure formed by the die, shown engaging a clamping plate having a guide track therein; and Fig. 10 is a bottom plan view of the clamp plate of Fig. 9.

Figure 1:
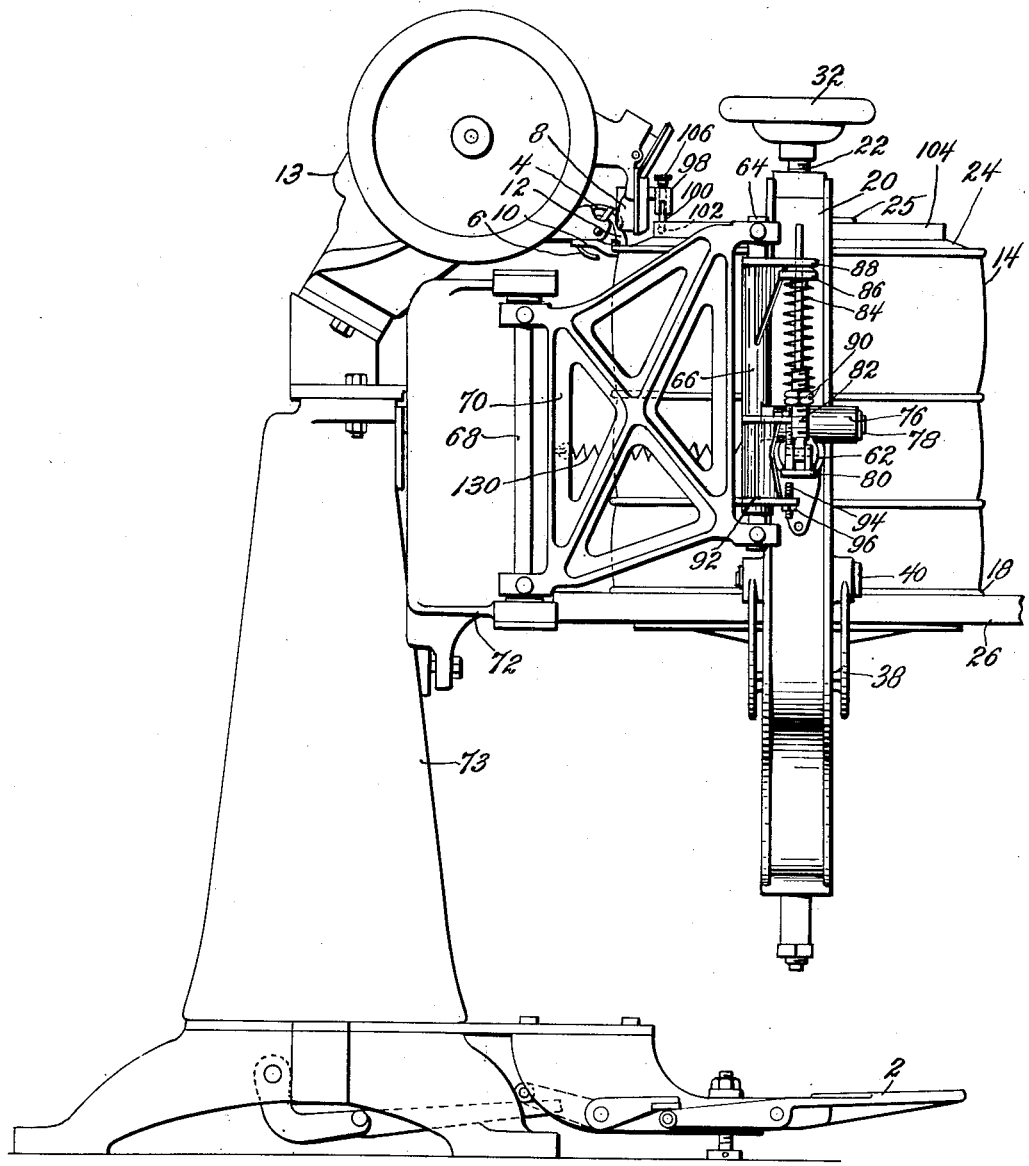
Fig. 1 is a view in side elevation looking from the left of a hassock fastening machine, embodying features of the present invention.

The fastening machine illustrated in the drawings is a curved hook needle lockstitch sewing machine similar to that disclosed in the application above identified and in United States Letters Patent No. 1,169,909, granted February 1, 1916, upon application of Fred Ashworth and No. 2,271,611, granted February 3, 1942, upon application of Fred Ashworth and Carl Whitaker. The illustrated machine is provided with a hassock clamping support arranged to maintain the entire weight of a hassock secured therein at a convenient elevation for easy presentation of its corner edges to the stitch forming devices of the machine. As in the machine of the application the sewing operation is controlled by a starting and stopping treadle 2, acting through the system of levers extending forwardly beneath the hassock support into an accessible position at the front of the machine.

Referring more particularly to Fig. 1 of the drawings, the stitch forming devices for inserting the fastenings between the side walls of the casing along their edges and a bottom end closure are of the usual type including a curve hook needle 4, curved awl 6 and a shuttle 8. To secure the parts operated upon at the sewing point while each stitch is being inserted the machine is provided with a work support 10 and a presserfoot 12. All of the operating devices are mounted in a main frame 13.

Figure 6:
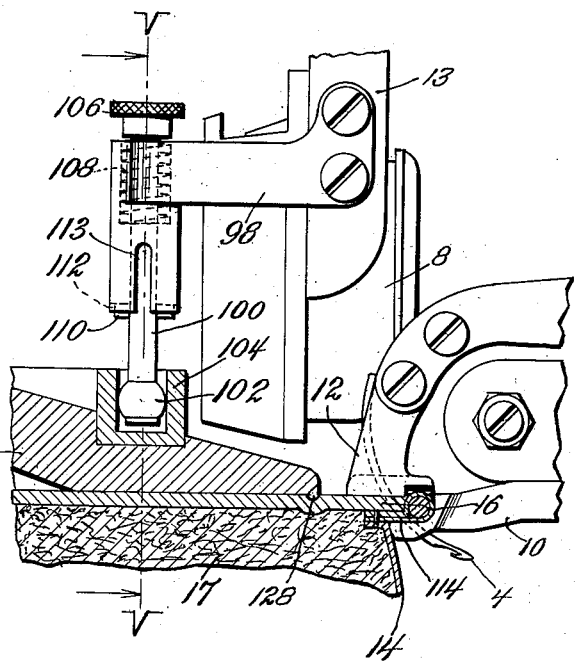
Fig. 6 is a sectional view of the same parts taken along the line VI—VI of Fig. 3.

As in the machine of the prior application, the illustrated machine is intended to operate in fastening together a stuffed side wall casing 14 and a bottom end closure 16 (see Fig. 6). To retain the stuffing material, indicated at 17, within the side wall casing, the top end also has a closure 18 already connected to it, the hassock parts being presented to the machine in upside-down relation. The bottom closure 16 is cut to size and the edges of the casing 14 and of the closure 16 are brought into meeting relationship with each other, the stuffing material within the side wall casing being compressed by a C-shaped clamp 20 including a jack screw 22 and an end plate 24 between which and the jack screw is disposed an anti-friction thrust bearing 25. To support the top end of the hassock in upside-down position, a clamping plate 26 having a concavity therein receives the bulging surface of the top end closure. The plate 26 is mounted upon an anti-friction thrust bearing 28 secured to the upper end of a rack bar 30. To operate the jack screw 22, the upper end has connected to it a hand wheel 32.

To clamp and release a hassock, the rack bar 30 has secured to it a horizontal disc 34 against the underside of which is pressed a pair of rolls 36 rotatably mounted on a horizontal axis, one at either side of an opening in a clamping lever 38, the fulcrum of which lever is indicated at 40 on the clamp 20. The forward end of the lever is provided with a handle 42 for raising and lowering the plate 26 toward and from clamping relation with the hassock.

To secure the plate 26 in clamping relation with a hassock, the rack bar 30 is engaged by a pair of pawls 44 pivotally mounted on a pin 46 mounted in the lower portion of clamp 20 as more fully described in inventor's copending application above identified. To release the pawls, they are engaged by a horizontal pin 48 carried by one arm of a bell-crank 50 rotatable on a stud 52 extending across the opening in the clamping lever, the bell-crank 50 being mounted within the opening. The other end of the bell-crank 50 is connected by a yieldingly actuated link 54 with a handle 56 rotatable on a stud 58 secured in the clamping lever.

The mounting for the hassock supporting clamp 20 is similar to that of the application referred to and comprises a horizontal pivot 60 extending laterally from and secured at one end to the clamp, rotatable within a horizontal sleeve bearing 62. The pivot 60 enables the meeting edges of a clamped hassock side wall casing and an end closure to swing toward and from the sewing point by rotation about an axis passing through the hassock. The bearing 62 is mounted for horizontal swinging movement to enable bodily movement of the hassock in two directions, one along the line of a seam inserted by the machine and the other toward and from the stitch forming devices. For this purpose the bearing 62 is rotatable about a pair of alined vertical hinge pivots. These vertical pivots consist of a spindle 64 clamped within a tubular member 66, which in turn supports the horizontal sleeve bearing 62 and a vertical spindle 68 (see Fig. 1) secured to lugs in a gate-like arm 70 rotatable about the spindle. The spindle 68 has its ends rotatably mounted in bearings carried by a bracket 72 bolted to the main column, indicated at 73, of the machine. Movement of the hassock along the line of the seam toward and from the stitch forming devices, causes swinging movement of the arm 70 and rotation of the spindles 64 and 68 in their bearings. As thus far described, the illustrated machine is similar to that of the machine disclosed in the application referred to.

In some instances it has been found desirable to raise and lower the hassock during sewing, particularly when the hassock is swung about its horizontal supporting pivot shaft 60. To do this in the machine of the application it is necessary to adjust the hand wheel corresponding to the wheel 32 and to raise and lower the clamping lever. This raising and lowering operation accordingly is somewhat complicated and can be accomplished in the middle of a seam only by stopping the machine temporarily and making the proper raising or lowering adjustments.

For convenience in presenting a hassock to the illustrated machine and to enable a hassock to be raised and lowered during sewing operations without stopping the machine and without making complicated adjustments, the hassock and clamp are yieldingly held in raised position, the weight of the hassock and clamp being counterbalanced in order to maintain the hassock in the proper position vertically. Instead of integrally connecting the bearing sleeve 62 for the horizontal pivot to the tubular member 66, as in the machine of the application, the bearing sleeve of the illustrated machine is integrally connected to a second horizontal bearing sleeve 76 disposed at right angles to the bearing sleeve 62. Within the bearing sleeve 76 is rotatably mounted a pivot 78 projecting laterally from the tubular member 66, the arrangement being such that the hassock and clamp may swing in a vertical direction about the pivot 78. The pivot 78 is located with its axis at one side of the hassock, extending at right angles to the plane of the clamp.

To counterbalance the weight of the hassock and clamp and to cause the hassock to be raised yieldingly into proper sewing position, the bearing sleeve 62 has secured to its lower surface a horizontal bar 80, to an upstanding block on which is pivotally connected a threaded shaft 82. Surrounding the shaft 82 is the lower end of a coil spring 84, the upper end of which engages a perforated seat 86 backed by a horizontal bar 88 projecting from the side of the vertical tubular member 66. The spring 84 is compressed between the seat 86 and a pair of check nuts 90 on the threaded shaft 82. To retain the spring 84 in place, the shaft 82 has a reduced portion at its upper end slidingly mounted in the perforation of the seat 86, the reduced portion also passing through an alined opening in the outer end of the bar 88. To limit the yielding movement of the hassock and clamp, the tubular member 66 also has projecting therefrom a yoke 92, the arms of which embrace the bar 80 and have threaded openings within which are mounted adjustable setscrews 94 arranged to engage the bar 88. The setscrews are secured in adjusted positions by check nuts 96.

In the machine of the application referred to, the hassock is presented manually to the machine and is maintained in proper operating relation, aside from the weight-supporting action of the clamp, entirely by the efforts of the operator while fastening an end closure to the edges of the side walls of a hassock casing. According to a feature of the present machine, it is only necessary for the operator to present a hassock to the machine before the machine is started and thereafter most, if not all, of the presenting movements are imparted to the hassock automatically as the operation progresses. This is accomplished in sewing a cylindrical hassock without substantial bodily movement of the hassock after being presented initially to the fastening devices in the machine. If the hassock is properly centered in its clamp it rotates concentrically on the trust bearings for the clamping plates 24 and 26 as the operation progresses, the operation being directed by conveniently arranged track and guide members. The movements of a square or an irregular shaped hassock are similarly directed by properly arranged track and guide members except that when it is necessary to sew about corners having relatively sharp radii, it may be necessary to apply small outside forces to move the hassock and clamp bodily with sufficient speed to enable continuity in the sewing operations without stopping or slowing down.

Figure 5:
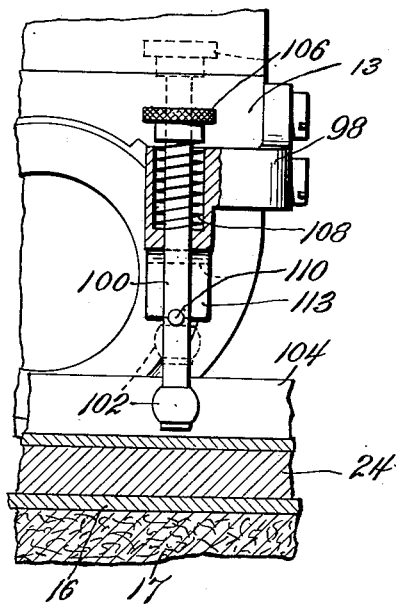
Fig. 5 is a detailed sectional view on an enlarged scale taken along the line V—V of Fig. 6, showing the track and guide members for directing the movement of a hassock during fastening.

The track and guide members of the illustrated machine are carried by the clamping plate 24 and the frame of the machine, respectively. Referring to Figs. 5 and 6, the frame 13 of the machine at the right side of the shuttle 8 has screwed to it a forwardly projecting bracket 98, at the forward end of which is slidingly mounted for vertical sliding movement a pin 100. The pin 100 has at its lower end a ball member 102 located at right angles to the seam line close to and in front of the sewing point. The member 102 is of the proper diameter to fit within the slot of a continuous channel track 104 which, in one form, is substantially rectangular in shape disposed with the channel opening upwardly. With this form of track a square or rectangular hassock may be sewed. With a round hassock, the track will be ring-shaped and the hassock will be disposed concentrically with the ring. The channel track is permanently secured to the upper surfaces of the clamping plate 24. If the hassock is located accurately with relation to the clamping plate on which the channel track is mounted, the sewing operation will then be directed properly throughout, the horizontal distance between the channel track and the point of sewing operations remaining always the same.

To assist in presenting a clamped hassock to the stitch forming devices in the machine initially, the pin 100 is raised to a position indicated by broken lines in Fig. 5 where it will not interfere with the track 104. For this purpose the pin near its upper end is provided with a knurled head 106 beneath which is a compression spring 108 received within a recess in the bracket 98. The spring 108 acts to raise the pin, and to prevent raising it, during sewing, it is locked in lowered position.

To lock the pin in lowered position engaging the track on the plate, the pin is provided with a crossbar 110 received within a pair of notches 112 at the lower end of the bracket 98. To enable the pin to be raised, the bracket is slotted so that the pin may be twisted 90° from its lowered position and the crossbar will then enter the slots, indicated at 113.

In the illustrated form of hassock the side wall casing 14 is similar to that disclosed in the application referred to and is provided at its edge with a beaded welt 114 received between the notched surfaces of the work support 10 and presser foot 12. Engagement of the beaded welt with the work support and presser foot assists in guiding the hassock during sewing operations. The counterbalance spring 84 is of sufficient strength to raise the edge of the hassock bottom end against the presser foot 12 at all times, thus directing the hassock vertically during sewing.

As a means for insuring accurate location of the clamping plate 24 on a hassock bottom, according to the method of the present invention, the bottom end closure 16 is provided with a series of indicating marks accurately spaced and located with relation to the side edges of the end closure. The sewing operation is then directed along the edges of the side wall casing and the bottom end closure entirely by reference to the marks on the bottom closure. To obtain this result a special cutting and marking die is employed. Such a die is indicated at 116 in Fig. 7 and shows its edge cutting blade at 118 and a series of marking lugs at 120. The marking lugs 120 are disposed opposite similar recesses 122 in a mating die 123. The arrangement is such that the cutting blade surrounding the die is equally spaced at all sides from the marking lugs. Thus, for a single operation of the die an end closure will be formed, as in Fig. 8, and simultaneously provided with rectangular side edges 124 and self-sustaining permanent marking indentations 126. For cooperation with the indentations 126 there is provided on the clamping plate 24 a series of gage lugs 128, the clamping plate being of smaller dimensions than the bottom end closure so that the end closure projects uniformly beyond the clamping plate when the gage lugs on the clamping plate enter the indentations 126, as shown in Fig. 9.

To locate the beaded strip 114 in proper relation to the end closure 16 before actuating the clamp, the end closure and the bead on the strip 114 are of proper dimensions to fit snugly when the end closure is applied in predetermined relation to the casing, as illustrated in the dot-dash lines in Fig. 9. In this way, the hassock which is presented bottom side up is held in a predetermined relation to the track 104.

The top end closure 18 being somewhat rounded out or of bulging shape fits into the concavity in the plate 26 which in turn is centered with relation to the thrust bearing 28. Accordingly, both ends of the hassock are accurately located in the clamp, securing them against the pressure of the stuffing material. Any slight variation or inaccuracy in centering the hassock will be compensated for by corresponding vertical movements of the hassock and clamp 20 about the horizontal pivot 78. During these movements the counterbalance spring 84 will relieve the operator of the necessity of making complicated adjustments or stopping the machine for repositioning purposes.

As in the machine of the application, the hassock is urged yieldingly rearwardly toward the operating point of the present machine. This is accomplished in the same manner as in the machine of the application by a tension spring 130 connected between the clamp 20 and an eye on the bracket 72.

The invention having thus been described what is claimed is:

1. A machine for sewing hassock end closures to the side wall casings thereof while enclosing a volume of stuffing material having a main frame, stitch forming devices in the frame, a support for bearing the entire weight of a hassock to facilitate presentation of a hassock to the stitch forming devices, including clamping means for holding the edges of the end closure and side wall casing together, in combination with a track on the clamping means, and a guide on the frame engaging the track for directing the movements of the meeting end closure and side edges of the hassock casing along the sewing point in the machine.

2. A machine for fastening hassock end closures to the side wall casings thereof while enclosing a volume of stuffing material having a main frame, fastening devices in the frame, a support for bearing the entire weight of a hassock to facilitate presentation of a hassock to the fastening devices, including clamping means having end clamping plates for holding the edges of the end closure and side wall casing together, in combination with a track on the clamping means, a guide on the frame engaging the track for directing the movements of the meeting end closure and side edges of the hassock casing along the sewing point in the machine, and a yielding mounting for the clamping plates to enable vertical movement of the hassock while presenting the meeting end closure and side casing edges to the fastening devices.

3. A machine for sewing hassock end closures to the side wall casings thereof while enclosing a volume of stuffing material having a main frame, stitch forming devices in the frame, a support for bearing the entire weight of a hassock to facilitate presentation of a hassock to the stitch forming devices, including clamping means for holding the edges of the end closure and side wall casing together, in combination with a track on the clamping means, a guide on the frame engaging the track for directing the movements of the meeting end closure and side edges of the hassock casing along the sewing point in the machine, a mounting for the clamping means to enable vertical movement of the hassock during sewing, and yielding means for counterbalancing the weight of the hassock and clamping means.

4. A machine for sewing hassock end closures to the side wall casings thereof while enclosing a volume of stuffing material having a main frame, stitch forming devices in the frame, a hassock support to facilitate presentation of a hassock to the stitch forming devices, including clamping means for holding the edges of the end closure and side wall casings together, in combination with a channel track on the clamping member and a guide on the frame engaging the track comprising a pin having a ball member engaging the track close to the sewing point for directing the movement of the meeting end closure and side edges of the hassock casing during their presentation to the stitch forming devices, a bracket on the frame in which the pin is slidable toward and from the channel track and means for locking the pin to the bracket and for releasing it from the bracket to enable a clamped hassock to be brought into operating position in the machine without interference between the track and pin.

5. A machine for sewing hassock end closures to the side wall casings thereof while enclosing a volume of stuffing material having a main frame, stitch forming devices in the frame, a hassock support to facilitate presentation of a hassock to the stitch forming devices, including clamping means for holding the edges of the end closure and side wall casing together, in combination with a track on the clamping member, a guide on the frame engaging the track close to the sewing point for directing the movements of the meeting end closure and side edges of the hassock casing along the sewing point in the machine, a mounting for the clamping means to enable vertical movement of the hassock during sewing, yielding means for counterbalancing the weight of the hassock and clamping means, and means for limiting the yieldingly vertical movement of the hassock and clamp.

6. The method of manufacturing hassocks which consists in providing a tubular side wall casing having a closure at one end and compressed stuffing material therein, applying a second end closure formed with self-sustaining indentations spaced uniformly from its edges, clamping the two end closures against the pressure of the stuffing material with a plate having gage lugs arranged to enter the indentations of the second closure and directing a fastening operation connecting the edges of the side wall casing and the second end closure by reference to the clamping plate.

7. The method of manufacturing hassocks which consists in providing a tubular side wall casing having a closure at one end and compressed stuffing material therein, cutting a second end closure and simultaneously indenting said closure at a uniform distance from the cut edges thereof, applying the second end closure to the side wall casing, clamping the two end closures against the pressure of the stuffing material with a plate having gage lugs entering the indentations of the second closure, and directing a fastening operation connecting the edges of the side wall casing and second end closure by reference to the clamping plate.

OTTO R. HAAS.

(References on following page)

REFERENCES CITED

The following references are of record in the file of this patent:

UNITED STATES PATENTS

| Number | Name | Date |
|---|---|---|
| 807,451 | Fisher | Dec. 19, 1905 |
| 810,882 | Phelps | Jan. 23, 1906 |
| 1,488,334 | Frey | Mar. 25, 1924 |
| 1,592,293 | Brackett et al. | July 13, 1926 |
| 1,947,058 | Pittoni | Feb. 13, 1934 |
| 2,307,430 | Thompson | Jan. 5, 1943 |
| 2,359,713 | Kessler | Oct. 3, 1944 |